US008952337B2

(12) United States Patent
Menge et al.

(10) Patent No.: US 8,952,337 B2
(45) Date of Patent: Feb. 10, 2015

(54) HIGH ASPECT RATIO SCINTILLATOR DETECTOR FOR NEUTRON DETECTION

(75) Inventors: Peter R. Menge, Chagrin Falls, OH (US); Michael R. Kusner, Auburn Township, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 400 days.

(21) Appl. No.: 12/784,034

(22) Filed: May 20, 2010

(65) Prior Publication Data

US 2012/0161011 A1    Jun. 28, 2012

Related U.S. Application Data

(60) Provisional application No. 61/186,654, filed on Jun. 12, 2009.

(51) Int. Cl.
*G01T 3/06* (2006.01)
*G01T 1/20* (2006.01)

(52) U.S. Cl.
CPC ............... *G01T 1/2002* (2013.01); *G01T 3/06* (2013.01)
USPC .................................................... 250/390.11

(58) Field of Classification Search
USPC .................................................... 250/390.11
See application file for complete search history.

(56) References Cited

U.S. PATENT DOCUMENTS

| 3,372,127 A | 3/1968 | Thomas et al. |
| 3,573,220 A | 3/1971 | Benson |
| 3,600,058 A * | 8/1971 | Kato .......................... 340/815.42 |
| 3,786,253 A * | 1/1974 | Haffner et al. .............. 250/360.1 |
| 3,808,549 A * | 4/1974 | Maurer ............................... 372/6 |
| 4,377,751 A * | 3/1983 | Kronenberg et al. ....... 250/474.1 |
| 4,507,226 A | 3/1985 | Noakes et al. |
| 5,231,290 A * | 7/1993 | Czirr et al. ............... 250/390.11 |
| 5,298,756 A | 3/1994 | McCollum et al. |
| 5,606,638 A | 2/1997 | Tymianski et al. |

(Continued)

FOREIGN PATENT DOCUMENTS

| EP | 0358413 A1 | 3/1990 |
| EP | 1944625 A2 | 7/2008 |

(Continued)

OTHER PUBLICATIONS

Borexino Collaboration; "Phenylxylylethane (PXE): a high-density, high-flashpoint organic liquid scintillator for applications in low-energy particle and astrophysics experiments"; Sep. 27, 2007 (V2); 2 pages <http://arxiv.org/abs/physics/0408032>.

(Continued)

*Primary Examiner* — David Porta
*Assistant Examiner* — Edwin Gunberg
(74) *Attorney, Agent, or Firm* — Abel Law Group, LLP; Robert N. Young (57) ABSTRACT

A detection device includes a photon sensor and a scintillator device optically coupled to the photon sensor. The scintillator device includes a scintillator material having a first refractive index, a first refractive material in a first annular space around the scintillator material, and a second refractive material in a second annular space around the first annular space. The first refractive material has a second refractive index. The second refractive index is less than the first refractive index. The second refractive material has a third refractive index. The third refractive index is less than the second refractive index.

22 Claims, 11 Drawing Sheets

(56) References Cited

U.S. PATENT DOCUMENTS

| | | | |
|---|---|---|---|
| 5,680,423 A | 10/1997 | Perkins et al. | |
| 5,859,946 A * | 1/1999 | Wojcik et al. | 385/125 |
| 6,449,416 B1 * | 9/2002 | Lee et al. | 385/127 |
| 7,105,832 B2 | 9/2006 | Dai et al. | |
| 7,126,148 B2 * | 10/2006 | Murray et al. | 250/269.4 |
| 7,148,471 B2 | 12/2006 | Roscoe et al. | |
| 7,183,554 B2 | 2/2007 | Gallagher et al. | |
| 7,233,007 B2 | 6/2007 | Downing et al. | |
| 7,313,221 B2 | 12/2007 | Sowerby et al. | |
| 7,329,874 B2 | 2/2008 | Shah | |
| 7,361,886 B2 | 4/2008 | Stoller et al. | |
| 7,365,333 B1 | 4/2008 | Shah et al. | |
| 7,372,041 B1 | 5/2008 | Nagarkar et al. | |
| 7,381,962 B2 | 6/2008 | Goldberg | |
| 7,514,694 B2 | 4/2009 | Stephan et al. | |
| 7,525,101 B2 | 4/2009 | Grodzins | |
| 2002/0130268 A1 | 9/2002 | Odom et al. | |
| 2003/0063874 A1 * | 4/2003 | Allan | 385/96 |
| 2003/0112916 A1 | 6/2003 | Keeney et al. | |
| 2004/0051048 A1 | 3/2004 | Murray et al. | |
| 2005/0023479 A1 | 2/2005 | Grodzins | |
| 2005/0104000 A1 | 5/2005 | Kindem et al. | |
| 2005/0105665 A1 | 5/2005 | Grodzins et al. | |
| 2005/0236577 A1 | 10/2005 | Katagiri | |
| 2006/0269033 A1 | 11/2006 | Taleyarkhan | |
| 2007/0001123 A1 | 1/2007 | Andrews et al. | |
| 2007/0057194 A1 | 3/2007 | Ryan et al. | |
| 2007/0069146 A1 | 3/2007 | Neal et al. | |
| 2008/0242687 A1 | 10/2008 | Gant et al. | |
| 2008/0255036 A1 | 10/2008 | Gant et al. | |
| 2008/0262086 A1 | 10/2008 | Grant et al. | |
| 2008/0311380 A1 | 12/2008 | Agrawal | |
| 2009/0014662 A1 | 1/2009 | Suhami | |
| 2009/0078881 A1 | 3/2009 | Dangendorf et al. | |
| 2009/0101825 A1 | 4/2009 | Kearfott | |
| 2009/0140157 A1 | 6/2009 | Meng | |
| 2009/0140158 A1 | 6/2009 | Clothier et al. | |

FOREIGN PATENT DOCUMENTS

| | | |
|---|---|---|
| WO | 0033106 A1 | 6/2000 |
| WO | 2006085307 A1 | 8/2006 |
| WO | 2006089097 A2 | 8/2006 |
| WO | 2007109535 A2 | 9/2007 |
| WO | 2008049116 A2 | 4/2008 |
| WO | 2008070619 A1 | 6/2008 |
| WO | 2008123892 A2 | 10/2008 |
| WO | 2009031074 A2 | 3/2009 |
| WO | 2009032503 A2 | 3/2009 |
| WO | 2009035895 A2 | 3/2009 |

OTHER PUBLICATIONS

Weber, Michael F. et al.; "Giant Birefringent Optics in Multilayer Polyer Mirrors" Science: vol. 287, Mar. 31, 2000; pp. 2451-2456.

The International Search Report and the Written Opinion for International Application No. PCT/US2010/035589 received from the International Searching Authority (ISA/KR) dated Dec. 29, 2010, 9 pages.

L. Swiderski, et al., "Further Study of Boron-10 Loaded Liquid Scintillators for Deterction of Fast and Thermal Neutrons," Nuclear Science Symposium Conference Record, 2008. NSS'08. IEEE, Oct. 19-25, 2008, 5 pgs.

* cited by examiner

HIGH ASPECT RATIO SCINTILLATOR DETECTOR FOR NEUTRON DETECTION

CROSS-REFERENCE TO RELATED APPLICATION(S)

The present application claims priority from U.S. Provisional Patent Application No. 61/186,654, filed Jun. 12, 2009, entitled "HIGH ASPECT RATIO SCINTILLATOR DETECTOR FOR NEUTRON DETECTION," naming inventors Peter R. Menge and Michael R. Kusner, which application is incorporated by reference herein in its entirety.

FIELD OF THE DISCLOSURE

This disclosure, in general, relates to scintillator-based detectors for neutron detection.

BACKGROUND

Scintillator-based detectors are used in a variety of applications, including research in nuclear physics, oil exploration, field spectroscopy, container and baggage scanning, and medical diagnostics. When a scintillator material of the scintillator-based detector is exposed to particle radiation, the scintillator material absorbs energy of incoming particles and scintillates, remitting the absorbed energy in the form of photons. A photon sensor of the scintillator-based detector detects the emitted photons.

Scintillator materials useful for detecting neutrons also tend to respond to gamma radiation. To determine the level of neutron radiation, scintillation pulses associated with neutron events are discriminated from scintillation pulses associated with gamma events. Scintillation pulses produced by a neutron interaction often have a slower decay than those produced by gamma interactions. For some configurations of scintillator-based detectors, the difference in scintillator pulse decay permits the use of pulse shape discrimination (PSD) to identify which scintillator pulses relate to neutrons and which relate to gamma interactions.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In a particular embodiment, a scintillator-based detection device includes a photon sensor and a scintillator optically coupled to the photon sensor. The scintillator includes a scintillator material, a first refractive material located in an annular space around the scintillator material, and a second refractive material located in a second annular space around the first annular space. The scintillator material has a higher refractive index than the first refractive material, and the first refractive material has a higher refractive index than the second refractive material. In addition, the scintillator can include a specular material disposed annularly around the second refractive material. The scintillator has a high aspect ratio, such as an aspect ratio of at least 10, where the axial length is at least 10 times that of the characteristic diameter. In a particular example, the scintillator material is a liquid scintillator material, such as an organic liquid scintillator material. The detection device can be coupled to a computational system which receives pulse data from the detection device, identifies counts associated with neutron interactions, and provides an indication of a level of neutron radiation.

For scintillator-based detectors having a high aspect ratio, where the axial length is greater than the characteristic diameter, and in particular for high aspect ratio prior art scintillator-based detectors including a liquid scintillator material, a scintillation photon can undergo a great many reflections along the inner diameter of the vessel before reaching a photon sensor. As a result, a given scintillation pulse can disperse in time since many different photons travel many different pathways leading to many different photon arrival times at the photon sensor. Accordingly, a scintillation pulse associated with a gamma event may lengthen enough to make it indiscernible from a scintillation pulse associated with neutron events. Such pulse lengthening can make pulse shape discrimination (PSD) difficult and many neutron events can be indiscernible from gamma events. Embodiments of the scintillator-based detectors described herein exhibit little or no pulse lengthening and as such, are better suited for use with pulse shape discrimination and energy discrimination techniques for identifying events.

In a further embodiment, a method of detecting neutron radiation includes exposing a detection device to a radiation source. The detection device includes a photon sensor optically coupled to a scintillator. The scintillator includes a scintillation material, a first refractive material located in an annular space around the scintillator material, and a second refractive material located in an annular space around the first refractive material. The method further includes receiving, at a computational device, pulse data from the detector device and analyzing the pulse data to determine a level of neutron radiation.

Figures 1, 2:
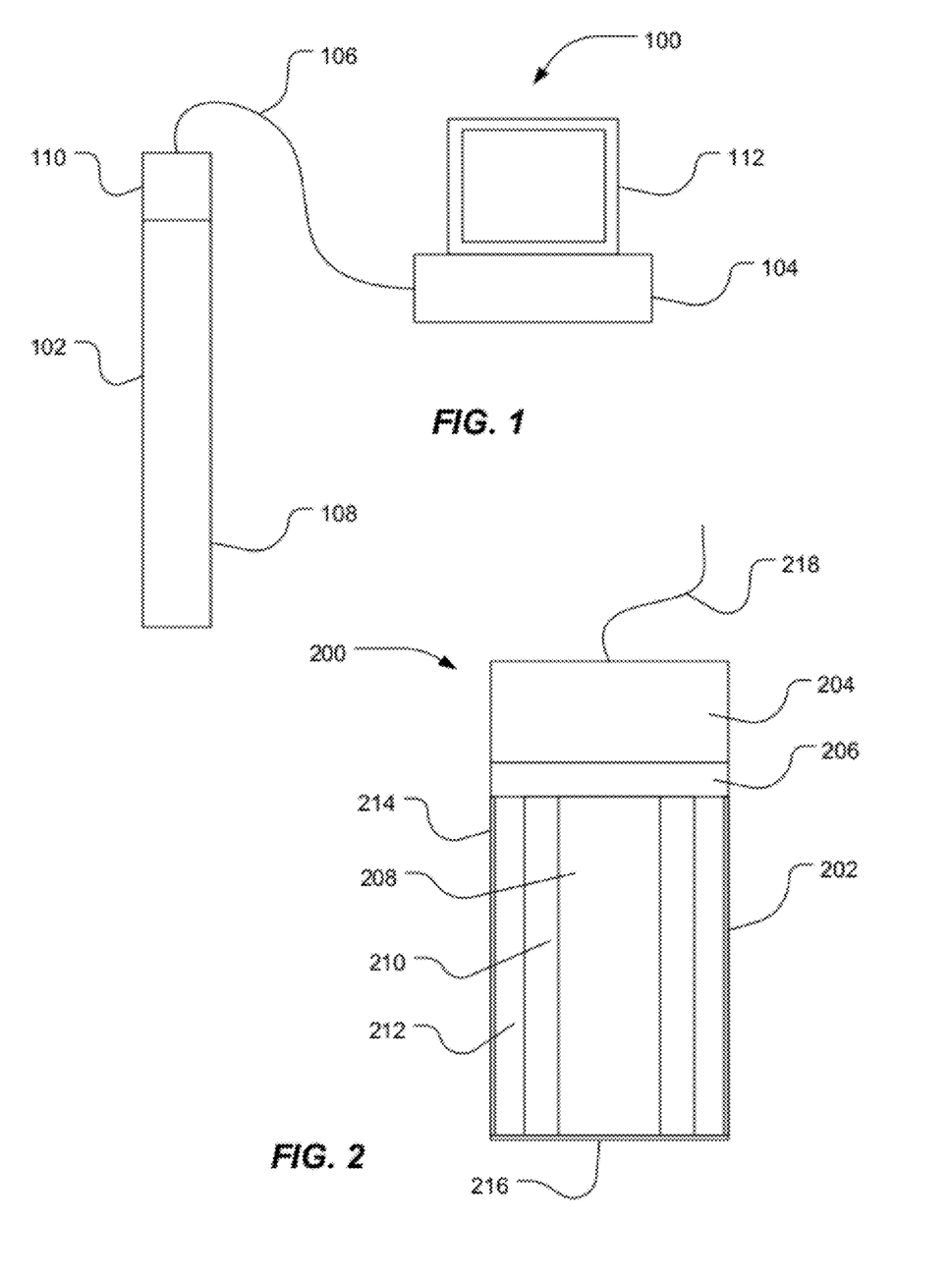
FIG. 1 includes an illustration of an exemplary scintillator-based system for detecting radiation.
FIG. 2 and FIG. 3 include illustrations of exemplary scintillator-based detection devices.

In the embodiment of a detection system 100 illustrated in FIG. 1, a detection device 102 is coupled to a computational device 104 via a communications interface 106. The detection device 102 includes a photon sensor 110 optically coupled to a scintillator 108. When in the presence of a radiation source, the scintillator 108 can produce scintillations that are detected by the photon sensor 110 and converted to pulse data that is transmitted via the communications interface 106 to the computational circuitry 104. The computational circuitry 104 can receive and analyze the pulse data.

For example, the computational circuitry 104 can perform pulse shape discrimination (PSD) to identify which scintillation pulses are associated with neutron events in contrast to scintillation pulses associated with gamma events. In another example, the computational circuitry 104 can perform energy discrimination to identify which scintillation pulses are associated with neutron events in contrast to scintillation pulses associated with gamma events. In a further example, the computation circuitry 104 can perform a combination of PSD and energy discrimination to identify scintillation pulses associated with neutron interactions.

The computational circuitry 104 can determine a number of neutron counts or a level of neutron radiation based on the identified number of neutron events. Further, the computational circuitry 104 can provide an indication of the number of neutron events or an indication of a level of neutron radiation via an interface 112. For example, the computational circuitry can provide a visual display via interface 112 indicating a level of neutron radiation.

Figure 11:
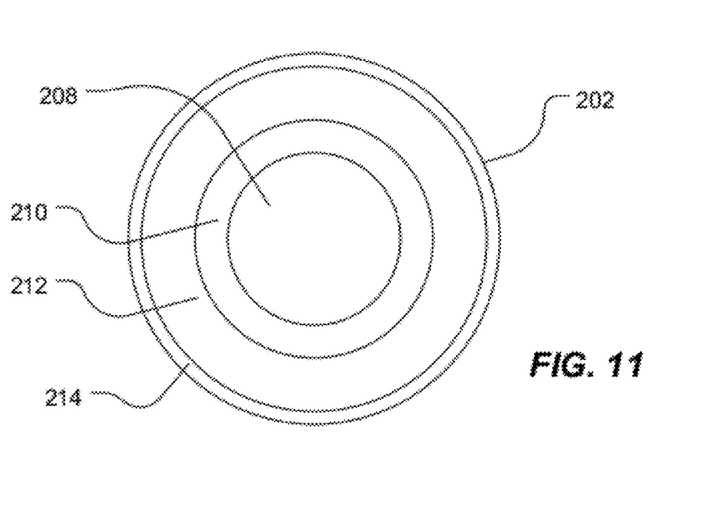
FIG. 11 includes an illustration of an exemplary scintillator-based detection device.

FIG. 2 and FIG. 11 include illustrations of an exemplary scintillator-based detection device 200, which includes a scintillator device 202 optically coupled to a photon sensor 204. For example, the scintillator device 202 can be optically coupled to the photon sensor 204 via a window 206. In an alternative example, the scintillator device 202 can be coupled to the photon detector 204 via a light pipe or guide. In a further example, the scintillator device 202 can be coupled to the photon detector 204 directly without an intermediate structure. A communications interface 218 can be coupled to the photon sensor 204. Pulse data can be provided from the photon sensor 204 via the communications interface 218 to a computational device. Alternatively, computational circuitry may be provided in the detection device 200 to perform analysis on the pulse data. While FIG. 2 illustrates an embodiment in which a single photon sensor 204 is located at one axial end of the scintillator device 202, alternative embodiments can include more than one photon sensor, such as a photon sensor on both ends of the scintillator device 202.

In an example, the photon sensor 204 can be photomultiplier tube (PMT). In an alternative example, the photon sensor 204 can include a semiconductor photon sensor, such as an avalanche photodiode.

The scintillator device 202 includes a scintillator material 208. For example, the scintillator material 208 can scintillate in response to particle radiation, such as neutron radiation. The scintillator material 208 can be a gaseous scintillator material, a liquid scintillator material, a solid scintillator material, or a combination thereof. In an example, the scintillator material 208 is a gaseous scintillator, such as a Xe or $^3$He scintillator material. In another example, the scintillator material 208 is a solid scintillator material, such as a ceramic scintillator material or a polymeric scintillator material. An exemplary ceramic scintillator material includes a lithium zinc phosphate material, zinc sulfide, or a combination thereof. An exemplary polymeric scintillator material includes a neutron absorber and a scintillating agent dispersed in a polymeric matrix, such as a silicone matrix, a polyvinyltoluene matrix, or a polystyrene matrix.

In a particular example, the scintillator material 208 is a liquid scintillator material. The liquid scintillator material can be a solution including a neutron absorber and a scintillating agent in a liquid base material, such as an aqueous base or an organic liquid medium. In an example, the organic liquid medium includes an organic solvent, such as toluene, xylene, benzene, phenylcyclohexane, triethylbenzene, decalin, phenylxylyl ethane (PXE), or any combination thereof. In addition, the liquid scintillator material can include a neutron absorber, such as a compound including a neutron responsive element, such as $^{10}$B, $^6$Li, $^{113}$Cd, $^{157}$Gd, or any combination thereof. For example, the neutron absorber can include lithium tetrafluoroborate, lithium chloride, sodium tetrafluoroborate, or any combination thereof. In addition, the scintillator material 208 can include a fluorescent scintillating agent to increase the fluorescence efficiency or shift the wavelength of the fluorescence to match the spectral sensitivity range of the photon sensor 204. An exemplary scintillating agent includes a polycyclic aromatic compound. In a particular example, the scintillating agent can include 2,5-diphenyloxazole, 1,4-bis-2-(5-phenyloxazolyl)-benzene), terphenyl, 1,1,4,4-tetraphenylbutadiene, or a combination thereof. In another example, a scintillating agent can include a lanthanide chelate, such as a tris complex of 2,6-pyridine dicarboxylic acid (dipicolinic acid, DPA), e.g., Li$_3$[Eu(DPA)$_3$]. Lanthanides that can be used in the chelate include europium (Eu), samarium (Sm), dysprosium (Dy), terbium (Tb), or a combination thereof. In another example, a scintillating agent can be a spin orbit coupling enhanced scintillating material, such as Ir(mppy)$_3$, iridium-tris[2-(4-totyl)pyridinato-NC$^2$], or pyrazolate-bridged cyclometalated platinum(II) complexes.

The refractive index of the scintillator material 208 can be at least 1.3. For example, the refractive index of the scintillator material 208 can be at least 1.4, such as at least 1.45, at least 1.5, or even at least 1.55. In the case of a liquid scintillator material, the refractive index can be not greater than 2, such as not greater than 1.7.

The scintillator material 208 can have a cross-sectional shape that is circular, ovular, or polygonal. As used herein, annular refers to a region around the perimeter of the cross-section of the material and extending along the length of the material. In a particular example, the scintillator material 208 has a circular cross-section. For example, FIG. 11 includes an illustration of a cross-section of the scintillator device 202 having a circular cross-section.

In an example, the scintillator has a characteristic diameter defined as the square root of four times the cross-sectional area (A) of the scintillator material divided by Pi, i.e., sqrt (4*A/Pi). In an example, the characteristic diameter of the scintillator is at least 10 mm. For example, the scintillator can have a characteristic diameter of at least 20 mm, such as at least 30 mm, at least 40 mm, at least 45 mm, or even at least 50 mm. In particular, the characteristic diameter can be less than 1 meter.

Further, the scintillator has an aspect ratio defined as the axial length of the scintillator material 208 divided by the characteristic diameter of the scintillator material 208. In an example, the scintillator has an aspect ratio of at least 5. For example, the aspect ratio can be at least 10, such as at least 15, at least 20, at least 25, or even at least 30. In an example, the aspect ratio is not greater than 100.

As illustrated in the embodiments of FIG. 2 and FIG. 11, a first refractive material 210 is located in an annular space around the scintillator material 208. In the case of a gaseous or liquid scintillator material, the first refractive material 210 acts as a container for the scintillator material 208. In addition, a second refractive material 212 is located in an annular space around the first refractive material 210. A specular material 214 can annularly surround the second refractive material 212. Further, a specular material 216 can be disposed at an end of the scintillator device 202 opposite the photon sensor 204. The specular material 214 and the specular material 216 can form a housing or a surface of a housing. Alternatively, a specular material 214 can be supported by the second refractive material 212 or, alternatively, by rings (not shown) surrounding the first specular material 210 and extending through the second refractive material 212. In the embodiment illustrated, the scintillator material 208 forms a central cylinder annularly surrounded by the first and second refractive materials (210 and 212).

The first refractive material 210 is located in an annular space around the scintillator material 208 and is formed of materials that are transparent. In addition, the first refractive material 210 has a lower refractive index than the scintillator material 208. A material is transparent if it permits scintillated photons to pass through the material without substantially being absorbed, e.g., at least 65% transmission, such as at least 70% transmission, at least 80% transmission or even at least 90% transmission. In an example, the first refractive material 210 can be formed of a ceramic material or a polymeric material. An exemplary ceramic material can include borosilicate glass, fused quartz, silica glass, aluminosilicate glass, sapphire, an aerogel, or any combination thereof. An exemplary polymeric material can include an acrylic polymer, a cellulose acetate polymer, an epoxy, a fluoropolymer, ethylvinyl acetate, a silicone, polyisoprene, a polyether, a polyester, a polyolefin, cyanoacrylate, or any combination thereof. In an example, the acrylic polymer can include polymethyl methacrylate. Particularly in the case of a liquid scintillator material having a refractive index of at least 1.4, such as at least 1.5, the first refractive material 210 can have a refractive index less than 1.5, such as less than 1.4. The refractive index of the first refractive material 210 can be at least 1.

The second refractive material 212 has a lower refractive index than the first refractive material 210. In a particular example, the second refractive material 212 can be a gaseous refractive material, a liquid refractive material, or a solid refractive material. For example, the gaseous refractive material can be air or an inert gas, such as nitrogen or helium. Alternatively, the second refractive material 212 can be a vacuum having a low amount of physical matter. In another example, the second refractive material 212 can include an aerogel.

The specular material 214 or the specular material 216 can be a mirror or mirror-like material. In another example, the specular material 214 or 216 can be a birefringent material. In a particular example, the specular material 214 or 216 is substantially specular having a specular lobe coefficient characterized by a Gaussian distribution about the angle of reflectance having a standard deviation of not greater than 10°, such as not greater than 5°.

In a particular example, the first refractive material 210 can have a thickness in the radial direction of at least 500 microns, such as at least 1 mm, at least 2 mm, or even at least 3 mm. In a particular example, the first refractive material has a thickness not greater than 250 mm. The second refractive material 212 can have a thickness in the radial direction of at least 500 micrometers, such as at least 1 mm, at least 2 mm, or even at least 3 mm. In particular, the second refractive material 212 has a thickness in the radial direction of not greater than 250 mm. In particular, the first refractive material 210 and the second refractive material 212 can have radial thicknesses that are not greater than 50% of the characteristic diameter of the scintillator material 208, such as not greater than 25% of the characteristic diameter, or even not greater than 15% of the characteristic diameter of the scintillator material 208.

In particular, the scintillator material 208 has a higher refractive index than the first refractive material 210, and the first refractive material 210 has a higher refractive index than the second refractive material 212. For example, the difference between the refractive index of the scintillator material 208 and the refractive index of the first refractive material 210 can be at least 0.04, such as at least 0.1, at least 0.15, or even at least 0.2. In an example, the difference between the refractive index of the first refractive material 210 and that of the second refractive material 212 is at least 0.1, such as at least 0.2, at least 0.3, at least 0.35, or even at least 0.4. The difference between the refractive index of the scintillator material 208 and the second refractive material 212 can be at least 0.3, such as at least 0.4, or even at least 0.5.

A Refraction Ratio is defined as the ratio of the difference between the refractive indexes of the scintillator material 208 and the second refractive material 212 relative to the refractive index of the second refractive material 212. For example, the Refraction Ratio of the scintillator can be at least 0.3, such as at least 0.4, or even at least 0.5.

Figure 3:
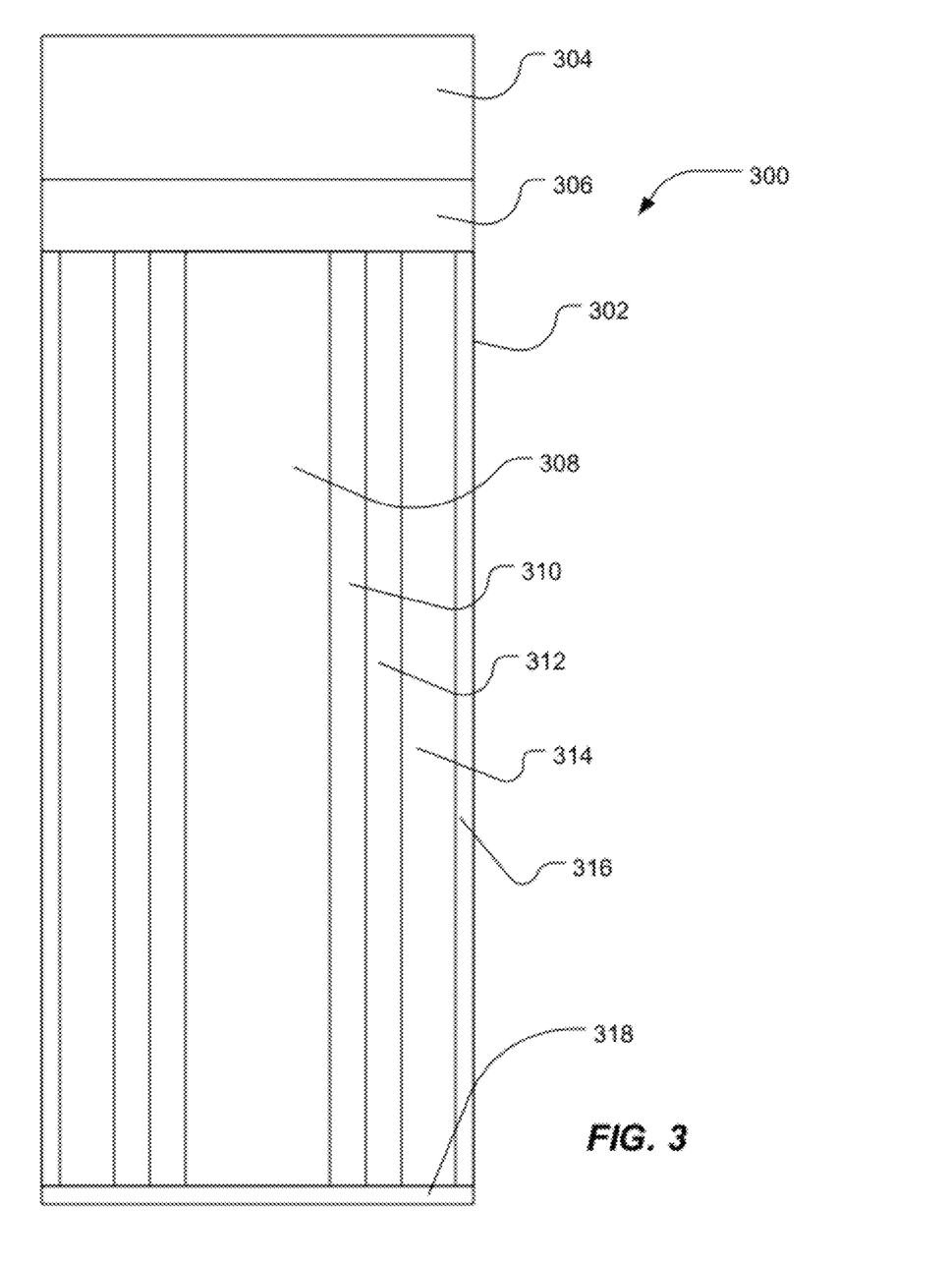

In a further embodiment, additional refractive materials can be located in annular spaces between the first refractive material and the second refractive material. For example, FIG. 3 illustrates a scintillator-based detection device 300, which includes scintillator device 302 connected to a photon sensor 304 via a window 306. The scintillator device 302 includes a scintillator material 308, a first refractive material 310 in an annular space around the scintillator material 308, a second refractive material 312 in an annular space around the first refractive material 310, and a third refractive material 314 in an annular space around the second refractive material 312. The first refractive material 310 has a refractive index lower than the scintillator material, the second refractive material 312 has a refractive index lower than the first refractive material 310, and the third refractive material 314 has a refractive index lower than the second refractive material 312. While FIG. 3 illustrates an embodiment including three layers of refractive material, the scintillator device 302 can include two layers, three layers, four layers, or more layers of refractive material when viewed in cross-section.

In addition, the scintillator device 302 includes a specular material 316 disposed annularly around the third refractive material 314 and a specular material 318 positioned at an end of the scintillator 312 opposite the window 308 and photon sensor 304.

Embodiments of the described configuration of detection devices provide for count histograms for both neutron and gamma events that have reduced overlap in the time-to-collect domain. As explained in more detail in the Examples below, when overlap of the expected gamma versus neutron histograms occurs in a time-to-collect domain, counts that can be associated with neutron events that have a time-to-collect that overlap with the expected gamma histogram are discarded when using pulse shape discrimination (PSD) because of an uncertainty as to whether the counts are caused by neutrons or gamma events. Such histogram overlap is particularly problematic in prior art high aspect ratio liquid scintillator-based detection devices. In contrast, embodiments of the above-described detection devices provide reduced overlap that leads to a higher acceptance rate or lower rejection rate of counts associated with neutron events. In particular, the detection device can have a Rejection Index, defined as the percent of neutron counts expected to be rejected when using PSD based on overlap with the expected gamma counts, of not greater than 25. For example, the Rejection Index can be not greater than 23, such as not greater than 20, not greater than 15, not greater than 10, not greater than 5, not greater than 2, or even not greater than 1.

Scintillator-based detection devices, particularly prior art high aspect ratio liquid scintillator-based detection devices, also suffer from a lack of uniformity in collected energy associated with neutron events for interactions that occur at different points along the axial length of the scintillator material. The average number of photons collected per pulse associated with interactions that occur at a given location can vary significantly between locations within the scintillator material. As a result, energy discrimination techniques, also called pulse height discrimination techniques, to identify neutron interactions as opposed to gamma interactions are difficult to perform. To characterize pulse height uniformity, the average pulse height or average number of collected photons for events occurring at 1.5% of the axial distance from the end of the scintillator material closest to the photon sensor and the average pulse height for events occurring at 50% of the axial distance are compared. The Uniformity Index is defined as 100 times the ratio between the difference of the two average pulse heights divided by the average pulse height for events occurring at 1.5% of the axial distance. Uniformity Index is determined based on the output of the photon sensor prior to additional computational analysis. For example, if the average number of collected photons for an interaction occurring at 50% of the axial distance is 70 and the average number of collected photons for an interaction occurring at 1.5% of the axial distance is 160, then the Uniformity Index is 56. In particular, the detection device can have a Uniformity Index of not greater than 50, such as not greater than 25, not greater than 15, not greater than 10, not greater than 5, or even not greater than 3.

The above described configurations are particularly effective at providing event responses that preserve both pulse shape discrimination and energy discrimination for high aspect ratio liquid scintillators. While such configurations are particularly effective for liquid scintillator-based detection devices that have a high aspect ratio and detect neutron radiation, such configurations can also be used with other scintillator-based detection devices using other scintillator materials.

In a particular embodiment, a detection device includes a photon sensor and a scintillator device optically coupled to the photon sensor. The scintillator device includes a scintillator material, a first refractive material in a region at least partially surrounding the scintillator material, and a second refractive material in a region at least partially surrounding the first refractive material. In an example, for various geometries of the scintillator material, such as cylindrical, spherical, or prismatic geometries, the first refractive material at least partially surrounds the scintillator material, and the second refractive material at least partially surrounds the first refractive material such that a photon associated with a scintillation within the scintillator material and traveling at an angle less than a critical angle can traverse an interface between the scintillator material and the first refractive material and subsequently, can traverse an interface between the first refractive material and the second refractive material. Optionally, regions of the scintillator material not at least partially surrounded by the first or second refractive material can be proximal to a reflective surface, such as a specular surface.

EXAMPLES

The expected behavior of a scintillator-based detector configuration is determined using a Monte Carlo-based computer simulation. Using the simulation, studies are performed to determine the effect of various configurations on pulse data resulting from gamma and neutron events. In addition, studies are performed to determine the influence of the position of a gamma or neutron interaction on the resulting pulse data.

Figure 4:
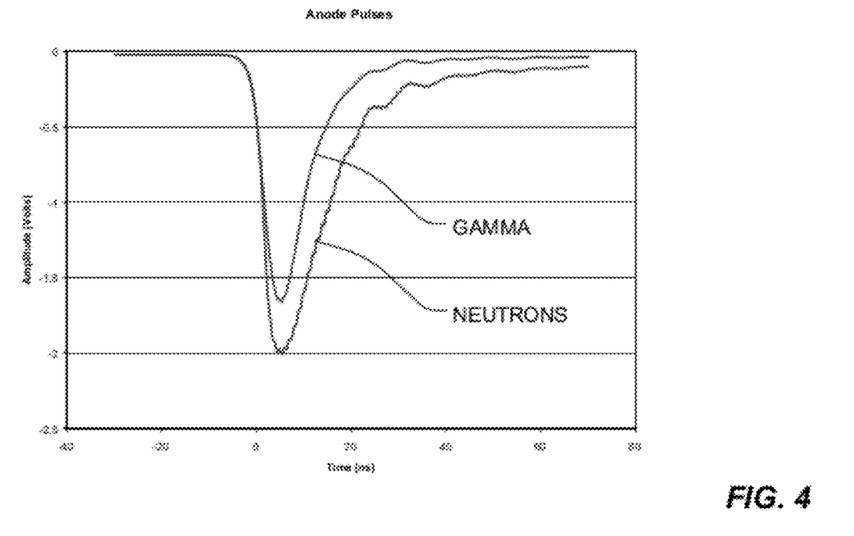
FIG. 4 and FIG. 5 include graphs illustrating pulse data for various configurations of scintillation-based detection devices.

Each gamma or neutron event results from an interaction of gamma radiation or a neutron with the scintillator material. Photons are produced from the scintillator material in response to the gamma or neutron event and traverse various pathways to a photon sensor. In response, the photon sensor provides pulse data. FIG. 4 illustrates exemplary pulse data for a gamma event and a neutron event.

Figure 5:
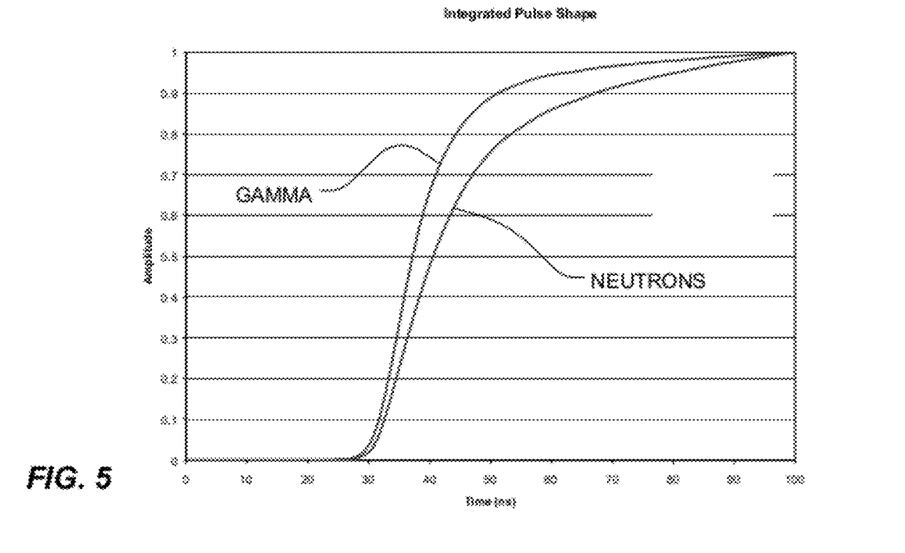

During analysis, the pulse data is integrated and normalized to 1, as illustrated in FIG. 5. For the integrated and normalized pulse, the time-to-collect is a measurement of the difference in time between 0.1 and 0.9. For example, the illustrated gamma pulse has a time-to-collect of 20 ns, and the illustrated neutron pulse has a time-to-collect of 35 ns. In addition, data can be collected that is proportional to the total number of photons collected per pulse. The data resulting for each pulse is recorded as a count. The simulation is repeated to provide a histogram of counts associated with events. Accordingly, the histogram of counts can be presented for the domain of time-to-collect or photons-per-pulse. Such histograms can be used for pulse shape discrimination or energy discrimination to identify counts associated with neutron events.

Example 1

A simulation of a high aspect ratio detection device with a liquid scintillator is performed. The exemplary configuration includes a Teflon® container having a diameter of 50 mm and an axial length of 152 cm, providing an aspect ratio of approximately 30. The Teflon® tube is filled with liquid scintillator. The configuration also includes a mirror at one end and a photomultiplier tube (PMT) at the opposite end.

The simulation is used to determine the time-to-collect associated with gamma or neutron events. Based on the overlap of a count histogram associated with gamma events and a count histogram associated with neutron events over the time-to-collect domain, pulse shape discrimination can be performed. In an example, counts having a time-to-collect that fall within an overlapping region with the gamma count histogram are indistinguishable from gamma events and are discarded. Accordingly, a large overlap between the gamma count histogram and the neutron count histogram results in fewer identified neutron counts, rending the scintillator less sensitive.

Figure 6:
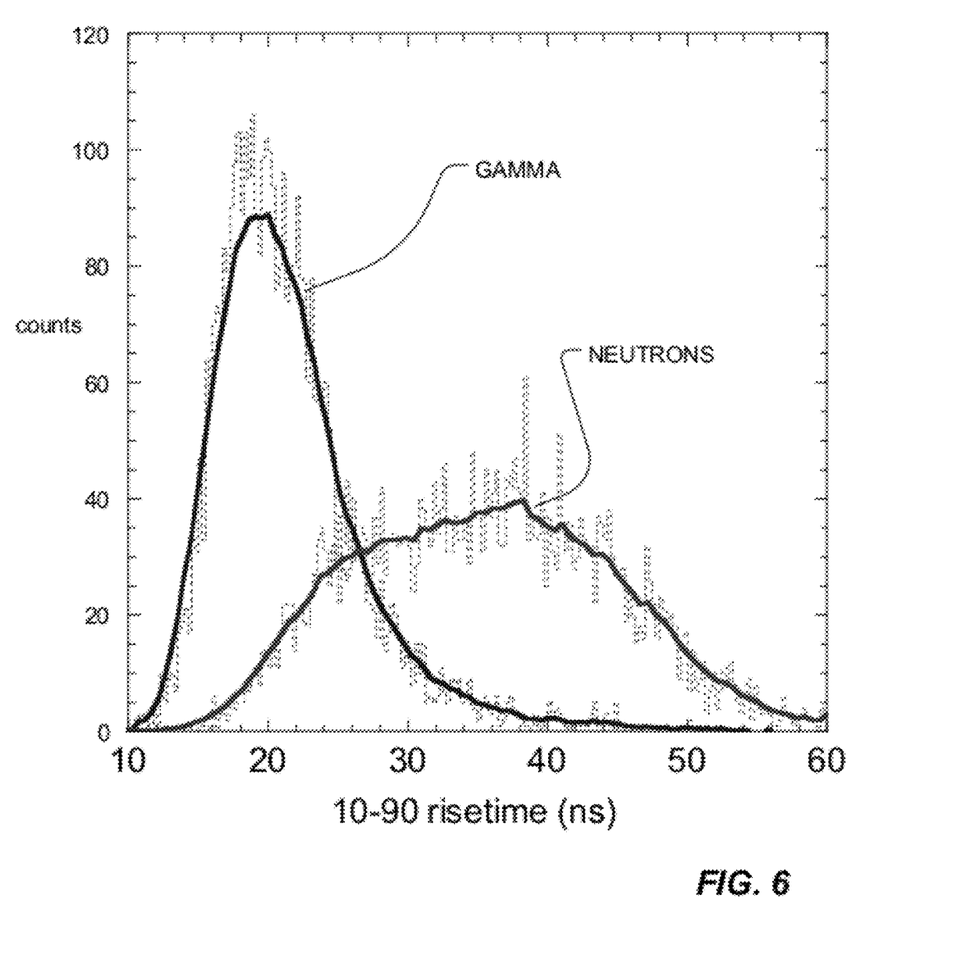
FIG. 6, FIG. 7, FIG. 8, FIG. 9, and FIG. 10 include graphs illustrating count histograms associated with scintillation-based detection devices.

FIG. 6 illustrates the distribution of counts for gamma events and neutrons assuming the gamma or neutron interactions occur at the center of the detector, i.e., 76 cm from each end of the scintillator material. As illustrated, the distributions for both the gamma and neutron counts for the high aspect ratio detector overlap for nearly the entire time-to-collect domain, up to about 55 nanoseconds. With no overlap, gamma ray and neutron interactions can be discriminated from each other. For the Teflon® tube configuration, application of pulse shape discrimination (PSD) results in the rejection of 98% of the neutron counts because only those counts beyond 55 ns can be confidently identified as neutrons counts.

Example 2

Configurations similar to Example 1 are simulated using a perfectly diffuse reflector or a specular reflector in place of the Teflon® container. PMTs are located on both ends of the detector. Photons-per-pulse data is collected for each count associated gamma or neutron events.

In an example, neutron counts can be identified using energy discrimination. For example, the total number of photons collected during the pulse or the amplitude of the pulse curve (see, for example, FIG. 4) can be used to determine the energy or pulse height associated with an event. However, a lack of uniformity between pulse heights associated with events occurring at different locations within the scintillator material or an overlap between pulse heights associated with gamma counts or neutron counts limits identification of neutron events.

Figure 7:
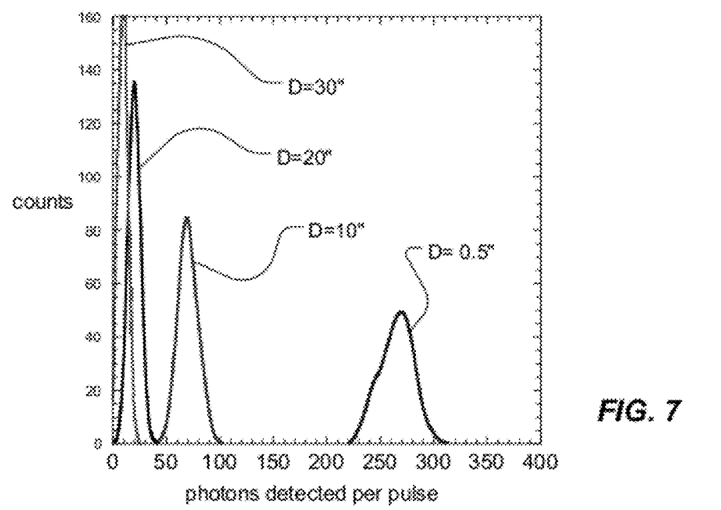
Figure 8:
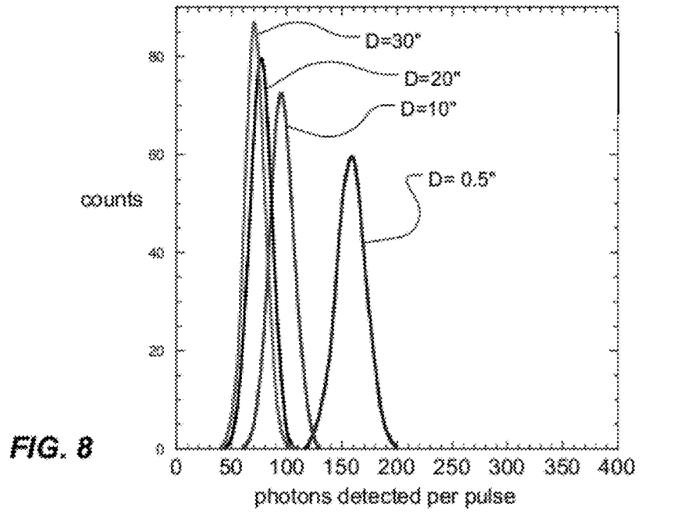

As illustrated in FIG. 7, the pulse height (average number of photons collected per pulse) for interactions at 1½% of the axial length of the scintillator material from the window or photo sensor is significantly different that the pulse height for interactions that occur at 50% of the axial length, when using a diffuse reflector. D represents the axial distance in inches from a PMT, 0.5 inches representing 1½% of the axial distance and 30 inches representing 50% of the axial distance. The pulse height is the number of photons collected per pulse at the peak number of counts for interactions occurring at the named location or, in other words, the average number of photons collected per pulse for interactions occurring at the named location. In contrast, as illustrated in FIG. 8, a configuration including a specular reflector around the scintillator material narrows the photons-per-pulse domain over which the counts are distributed and provides for more uniform pulse heights. However, the uniformity of the peaks is still poor, providing a Uniformity Index of approximately 56.

Example 3

A simulation is performed for a configuration including a liquid scintillator having a phenylxylyl ethane (PXE) based liquid scintillator in a quartz container surrounded by air with a specular material annularly surrounding the air. The scintillator material has a diameter of 5 cm and a length of 152 cm, providing an aspect ratio of approximately 30. The PXE liquid scintillator material has refractive index of 1.565, the quartz container has a refractive index of 1.46, and air has a refractive index of approximately 1. As in Example 1, the configuration also includes a specular material, such as a mirror, at one end and a photomultiplier tube (PMT) at the opposite end.

Figure 9:
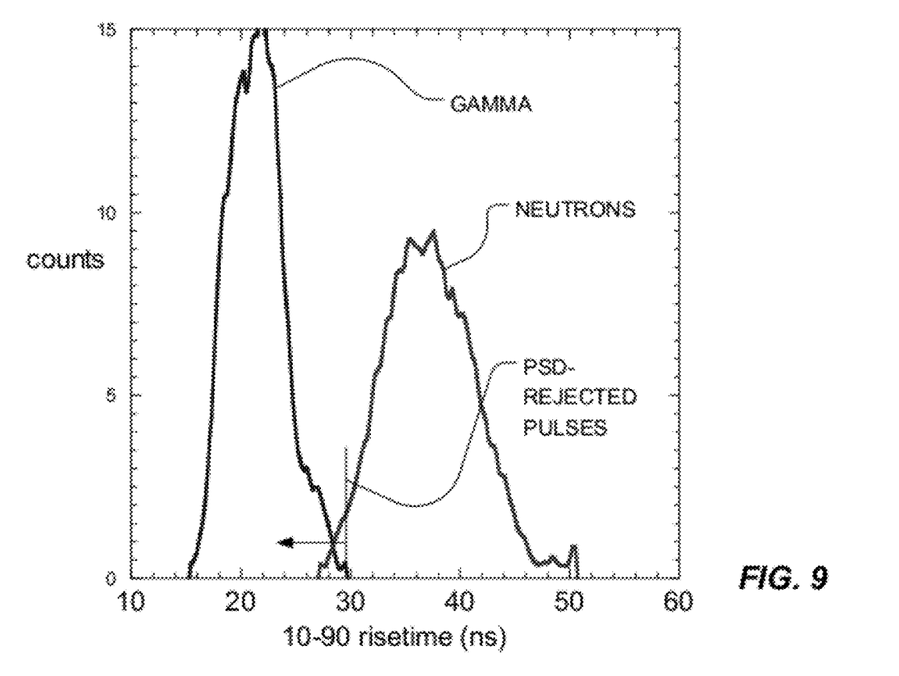

When scintillation light is produced 76 cm from PMT end of the detector, as illustrated in FIG. 9, the overlap region of the histograms of gamma counts and neutron counts in the time-to-collect domain is small. Accordingly, less than 2% of the pulses resulting from neutron events are rejected based on the overlap when applying pulse shape discrimination. The Rejection Index is less than 2, approximately 1.

Figure 10:
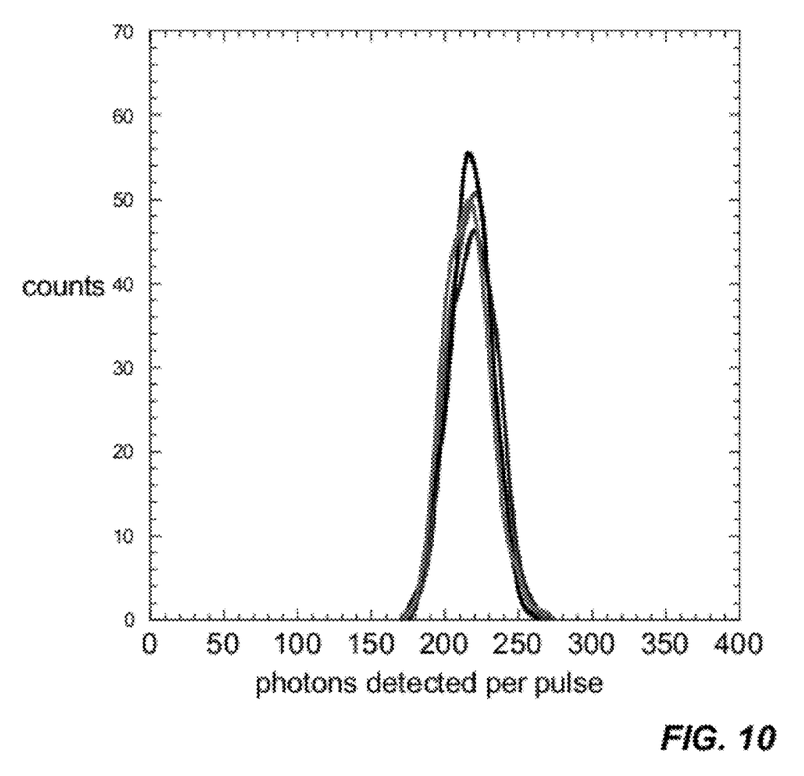

FIG. 10 includes an illustration of the histograms of the counts versus photons detected per pulse for a detector having the above configuration. The illustrated histograms are for interactions occurring at the same distances as those labeled in FIG. 7 and FIG. 8. In contrast to FIG. 7 and FIG. 8, the average number of photons collected for interactions at each location is nearly the same, having a difference of about 2.5%. Accordingly, the domain over which counts occur at a given location, as well as the average number of photons collected per pulse is more uniform, providing a Uniformity Index of less than 3. As such, the proposed configuration provides the ability to perform reliable pulse shape discrimination (PSD) and energy discrimination. When both techniques are used in combination, almost no counts associated with neutron events are rejected.

Example 4

Detectors having dimensions 76 cm long and 2.5 cm diameter are prepared. The scintillator is liquid PXE doped with terphenyl and $^{10}B$. The aspect ratio of the detectors is approximately 30. A first detector includes a diffuse reflector on the inside of the tube containing scintillator material similar to the comparative example described in relation to Example 2. A second detector is formed as described in relation to FIG. 2 and Example 3 and includes a scintillator (n=1.57) in a quartz tube (n=1.46) surrounded by an annulus of air (n=1.0) defined between the quartz tube and a specular reflector. The detectors are exposed to a gamma ray source (cobalt-57) that was collimated either 2.5 cm from the photomultiplier tube or 38 cm from the photomultiplier tube.

Figure 12:
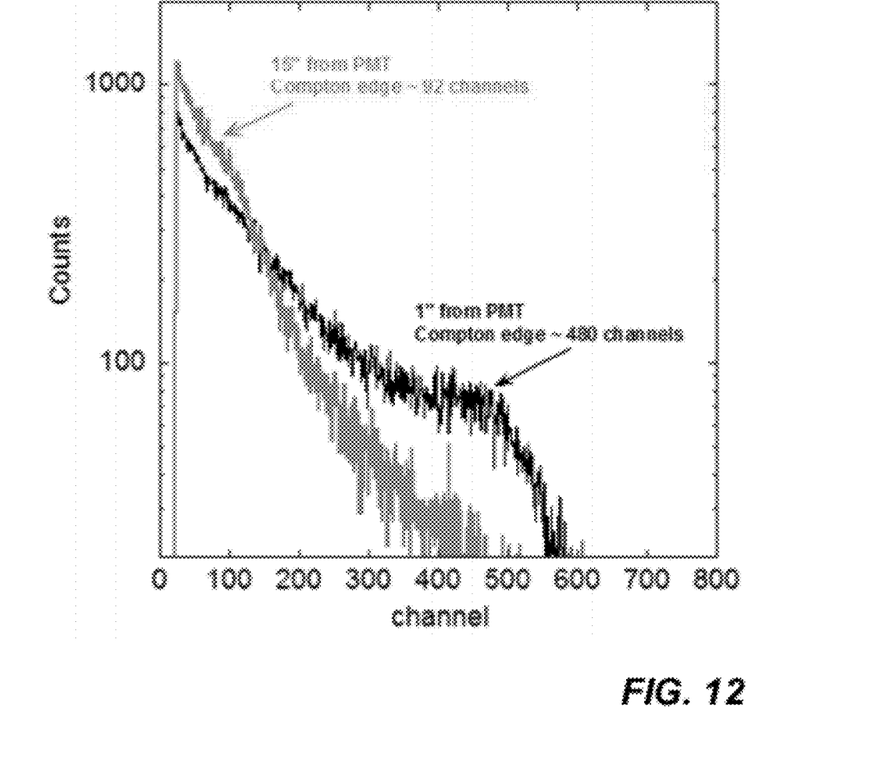
FIG. 12 and FIG. 13 include graphs illustrating a response of scintillation-based detection devices to exposure to a gamma ray source.
Figure 13:
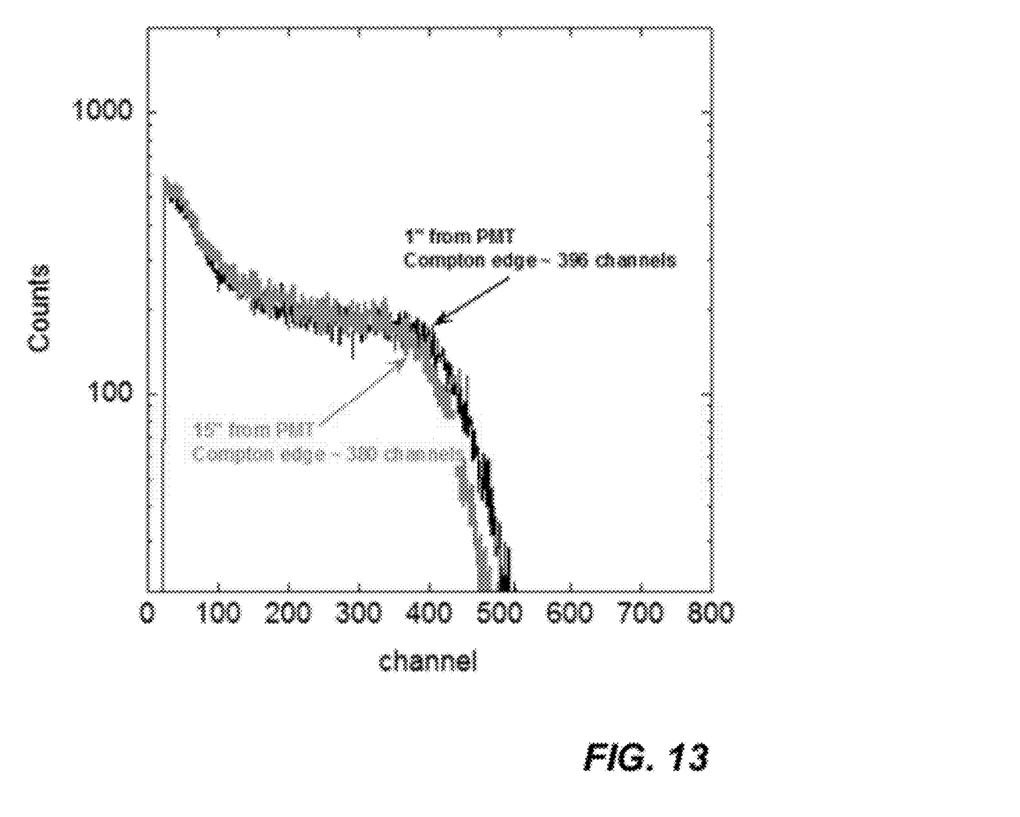

A spectral feature called the "Compton edge" is identified in the graphs of FIG. 12 and FIG. 13. At the Compton edge, an equal amount of gamma ray energy is deposited in the liquid scintillators (83 keV). Thus, an equal number of photons should have been created in each detector (on average) for each Compton edge event. However, as illustrated in FIG. 12, responses at 2.5 cm and 38 cm for the first detector have Compton edges that differ in both apparent energy and count. In contrast, the second detector provides responses at both 2.5 cm and 38 cm that are closely matched and exhibit approximately the same Compton edge.

Figure 14:
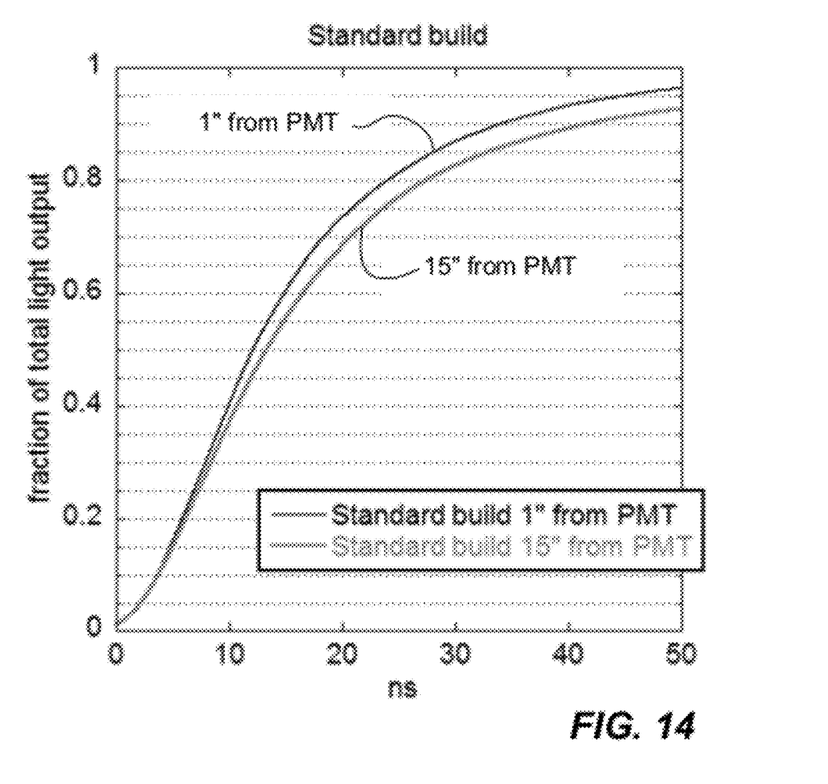
FIG. 14 and FIG. 15 include graphs illustrating the rise time of integrated scintillation pulses resulting from exposure of scintillation-based detection devices to a gamma ray source.
Figure 15:
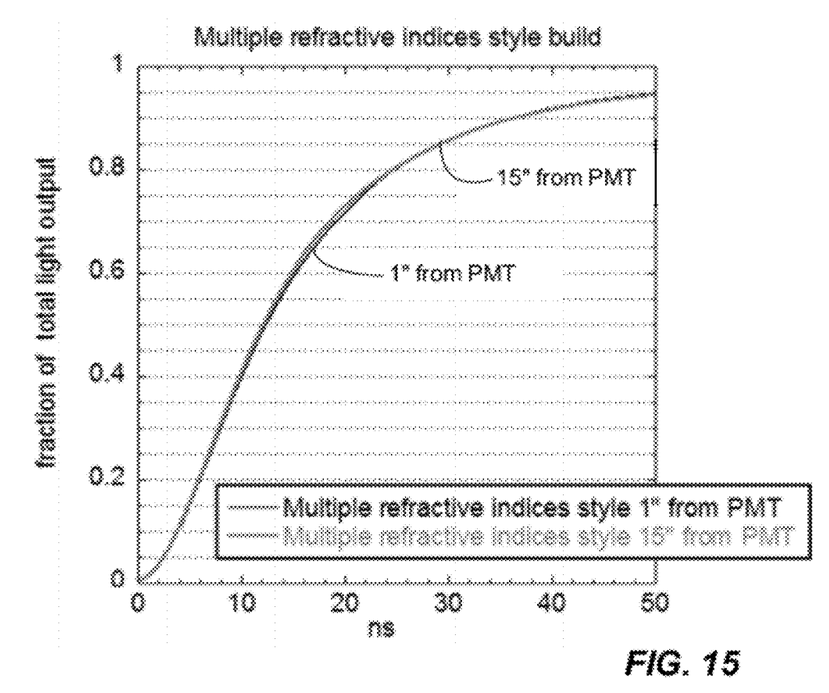

When observing the rise time of a response to gamma irradiation, the first detector exhibits a delay of an average of 11 ns between rise time (10%-90%) of the integrated pulse for exposure at 38 cm from the photomultiplier tube versus exposure at 2.5 cm from the photomultiplier tube, as illustrated in FIG. 14. Such a delay can significantly disrupt pulse-shape discrimination. In contrast, the second detector exhibits little variation in rise times, having a delay of substantially less than 1 ns, as illustrated in FIG. 15. Each of FIG. 14 and FIG. 15 is a graph of pulses attributed to gamma ray data and is an average of 50 gamma ray pulses.

In the first detector, which has standard construction (i.e., diffuse reflector on the interior of the tube containing the scintillator material) has a Uniformity Index of 80 at 50% of the axial length. Such a construction produces a non-uniform response for long aspect ratio detectors. In contrast, the second detector, which has a multiple refractive indices configuration as illustrated in FIG. 2 and described in Example 3 with layers (from the inside to outside): scintillator—quartz tube—air—specular reflector, has a Uniformity Index of 4.0. The second detector is well adapted for use with PSD and energy discrimination techniques for detecting and identifying gamma and neutron events.

In a particular exemplary embodiment, a detection device includes a photon sensor and a scintillator device optically coupled to the photon sensor. The scintillator device includes a transparent container having a first refractive index, a liquid scintillator material within the container, and a housing around the container and defining an annular space between the container and housing. The liquid scintillator material has a second refractive index. A refractive material having a third refractive index is located in the annular space. The second refractive index is greater than the first refractive index, and the first refractive index is greater than the third refractive index.

In another exemplary embodiment, a detection device includes a photon sensor and a scintillator device optically coupled to the photon sensor. The scintillator device includes a scintillator material having a first refractive index, a first refractive material in a first annular space around the scintillator material, and a second refractive material in a second annular space around the first annular space. The first refractive material has a second refractive index. The second refractive index is less than the first refractive index. The second refractive material has a third refractive index. The third refractive index is less than the second refractive index.

In a further exemplary embodiment, a detection device includes a photon sensor and a scintillator device optically coupled to the photon sensor. The scintillator device has an aspect ratio of at least 10. The detection device has a Rejection Index of not greater than 25.

In an additional embodiment, a detection device includes a photon sensor and a scintillator device optically coupled to the photon sensor. The scintillator device has an aspect ratio of at least 10. The detection device has a Uniformity Index of not greater than 25.

In another exemplary embodiment, a detection system includes a detection device. The detection device includes a photon sensor and a scintillator device optically coupled to the photon sensor. The scintillator device includes a scintillator material having a first refractive index, a first refractive material in a first annular space around the scintillator material, and a second refractive material in a second annular space around the first annular space. The first refractive material has a second refractive index. The second refractive index is less than the first refractive index. The second refractive material has a third refractive index. The third refractive index is less than the second refractive index. The detection system further includes a computational system communicatively coupled to the detection device. The computational system is adapted to receive pulse data from the detection device, to identify counts associated with neutron events, and to provide an indication of a level of neutron radiation.

In a further exemplary embodiment, a detection system includes a detection device. The detection device includes a photon sensor and a scintillator device optically coupled to the photon sensor. The scintillator device has an aspect ratio of at least 10. The detection device has a Rejection Index of not greater than 25. The detection system further includes a computational system communicatively coupled to the detection device. The computational system is adapted to receive pulse data from the detection device, to identify counts associated with neutron events, and to provide an indication of a level of neutron radiation.

In an additional exemplary embodiment, a method of detecting neutrons includes exposing a detection device to a source of radiation, receiving pulse data from the detection device at a computational device, and determining with the computational device an amount of the neutron radiation based on the pulse data. The detection device includes a photon sensor and a scintillator device optically coupled to the photon sensor. The scintillator device includes a scintillator material having a first refractive index, a first refractive material in a first annular space around the scintillator material, and a second refractive material in a second annular space around the first annular space. The first refractive material has a second refractive index. The second refractive index is less than the first refractive index. The second refractive material has a third refractive index. The third refractive index is less than the second refractive index.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A detection device comprising:
   a photo sensor having a light-receiving surface; and
   a scintillator device optically coupled to the photon sensor and lying along an axial centerline extending in a direction perpendicular to the light-receiving surface, wherein a lateral direction is perpendicular to the axial centerline, the scintillator device comprising:
   a transparent container having a first refractive index, wherein the transparent container comprises a ceramic material;
   a liquid scintillator material within the container, the liquid scintillator material having a second refractive index of at least 1.4, and, in the lateral direction, all of the liquid scintillator is contained within the container;
   a housing around the container; and
   an annular space between the container and housing, wherein the annular space:
   includes a gas;
   has a third refractive index has a width in the lateral direction of at least 500 micrometers;
   extends along an axial length of the scintillator device; and
   is spaced apart from the axial centerline;
   wherein the second refractive index is greater than the first refractive index, and the first refractive index is greater than the third refractive index.

2. The detection device of claim 1, wherein the housing comprises a specular material.

3. The detection device of claim 1, wherein the liquid scintillator material comprises an organic liquid media.

4. The detection device of claim 1, wherein the scintillator device has a characteristic diameter of at least 10 mm.

5. The detection device of claim 1, wherein the ceramic material includes borosilicate glass, fused quartz, silica glass, aluminosilicate glass, sapphire, an aerogel, or any combination thereof.

6. The detection device of claim 1, wherein the container comprises quartz.

7. The detection device of claim 1, wherein the container comprises a borosilicate glass.

8. The detection device of claim 1, wherein a difference between the first and second refractive index is at least 0.04.

9. The detection device of claim 1, wherein a difference between the first and third refractive index is at least 0.4.

10. The detection device of claim 1, wherein a difference between the second and third refractive index is at least 0.4.

11. The detection device of claim 1, wherein the scintillator device has a Refraction Ratio of at least 0.3.

12. The detection device of claim 1, wherein the detection device has a Rejection Index of not greater than 20.

13. The detection device of claim 1, wherein the detection device has a Uniformity Index of not greater than 50.

14. The detection device of claim 1, wherein the scintillator device having an aspect ratio of at least 30 andwherein the detection device has a Rejection Index of not greater than 25.

15. The detection device of claim 1, wherein the scintillator device has a characteristic diameter of at least 10 mm.

16. A detection device comprising:
a photon sensor having a light-receiving surface; and
a scintillator device optically coupled to the photon sensor and lying along an axial centerline extending in a direction perpendicular to the light-receiving surface, wherein a lateral direction is perpendicular to the axial centerline, the scintillator device comprising:
a scintillator material having a first refractive index of at least 1.4;
a first refractive material in a first annular space around the scintillator material, the first refractive material having a second refractive index, the second refractive index being less than the first refractive index;
a second refractive material including a gas and having a thickness in the lateral direction of at least 500 micrometers in a second annular space around the first annular space, wherein the second refractive material extends along an axial length of the scintillator device and is spaced apart from the axial centerline and has a third refractive index, the third refractive index being less than the second refractive index, wherein a difference between the second refractive index and the third refractive index is at least 0.4; and
a specular material disposed annularly around the second refractive material, wherein the first refractive material comprises a polymeric material including an acrylic polymer, a cellulose acetate polymer, an epoxy, ethylvinyl acetate, a silicone, polyisoprene, a polyether, a polyester, a polyolefin, cyanoacrylate, or any combination thereof.

17. The detection device of claim 16, further comprising a third refractive material in a third annular space around the second annular space, wherein the third refractive material has a fourth refractive index, the fourth refractive index being less than the third refractive index.

18. The detection device of claim 16, wherein a difference between the first and second refractive indexes is at least 0.04.

19. The detection device of claim 16, wherein the detection device has a Rejection index of not greater than 25.

20. The detection device of claim 16, wherein the detection device has a Uniformity Index of not greater than 25.

21. The detection device of claim 16, wherein a difference between the second refractive index and the third refractive index is at least 0.3.

22. The detection device of clam 16, wherein the first refractive material has a second refractive index of at least 1.5.

* * * * *